United States Patent [19]
Rhoades

[11] Patent Number: 5,548,974
[45] Date of Patent: Aug. 27, 1996

[54] METHOD AND APPARATUS FOR MAKING $CO_2$ SNOW BLOCKS

[75] Inventor: George D. Rhoades, LaGrange, Ill.

[73] Assignee: Liquid Carbonic Corporation, Oak Brook, Ill.

[21] Appl. No.: 475,929

[22] Filed: Jun. 7, 1995

[51] Int. Cl.⁶ .................................................. F25J 1/00
[52] U.S. Cl. ............................................. 62/604; 62/165
[58] Field of Search ............................. 62/604, 603, 605, 62/10, 35, 165

[56] References Cited

U.S. PATENT DOCUMENTS

| | | | |
|---|---|---|---|
| 1,877,180 | 9/1932 | Jones. | |
| 1,925,041 | 8/1933 | Auerbach. | |
| 2,138,758 | 11/1938 | Eastman | 62/603 |
| 3,922,878 | 12/1975 | Jalali | 62/384 |
| 4,374,658 | 2/1983 | Kawaguchi | 62/35 |
| 4,415,346 | 11/1983 | Love | 62/35 |
| 4,652,287 | 3/1987 | Allen et al. | 62/35 |
| 5,020,330 | 6/1991 | Rhoades et al. | 62/63 |
| 5,148,679 | 9/1992 | Eve | 62/10 |
| 5,257,503 | 11/1993 | Rhoades et al. | 62/10 |
| 5,271,233 | 12/1993 | Parker et al. | 62/62 |

FOREIGN PATENT DOCUMENTS

| | | |
|---|---|---|
| 56-17916 | 7/1979 | Japan. |
| 61-31869 | 7/1984 | Japan. |
| 353014 | 7/1931 | United Kingdom. |
| 404833 | 1/1934 | United Kingdom. |

*Primary Examiner*—William E. Tapolcai
*Attorney, Agent, or Firm*—Fitch, Even, Tabin & Flannery

[57] ABSTRACT

A method and apparatus for producing solid carbon dioxide snow blocks comprising a mold having a plurality of separate mold cavities, and a liquid $CO_2$ manifold providing one or more injection nozzles in each of the mold cavities. A vent/vapor heat exchange with incoming liquid may be employed to improve liquid-to-snow conversion rate. The manifold may take a pressure drop turn at each branch to assure that each nozzle receives an adequate supply of liquid $CO_2$. Each nozzle may have multiple orifices to assure that the snow is dispersed relatively evenly in each mold cavity. Each of the orifices may be located on a relative high point relative to the manifold to facilitate clearance of dry ice blockages in the manifold. A timer may be used to regulate injection. As an alternative or as a backup, fullness of one or more mold cavities may be detected by a sensor, and means may be provided to discontinue injection when one or more mold cavities have been filled.

17 Claims, 2 Drawing Sheets

METHOD AND APPARATUS FOR MAKING $CO_2$ SNOW BLOCKS

BACKGROUND OF THE INVENTION

The invention relates generally to a method and apparatus for manufacturing blocks of carbon dioxide snow which may be used for various applications including but not limited to cooling of shipping containers.

Dry ice has long been used for refrigeration of shipping containers. Its vaporization at a relatively low temperature without liquid residue and its light weight make it ideal for maintaining frozen food products and other products at acceptably low temperatures.

In refrigerated shipping containers which are cooled by dry ice, it is generally desirable to maximize the interior volume available for carrying product, while providing for the coolant only as much interior volume as necessary. In the past, there have been numerous efforts to provide high-density blocks of dry ice in order to maximize the refrigeration capacity that may be achieved for a given volume of dry ice.

As an alternative to high-density blocks of dry ice, lower-density $CO_2$ snow may be "charged" into shipping containers. $CO_2$ snow may be produced from liquid $CO_2$ stored under pressure in a storage vessel, and discharged through a snow horn. Low-density $CO_2$ snow may be produced more readily than high density blocks of dry ice. However, the low density $CO_2$ snow is susceptible to rapid evaporation. Thus, it is generally desirable that charging of $CO_2$ snow take place at or near the location at which it is produced.

In certain commercial operations such as distribution centers for fast food chains, one or more vessels of liquid carbon dioxide may be maintained for $CO_2$ snow production, but shipping containers, particularly cabinet-style containers or other containers for small shipments, may often be loaded at locations remote from any of the vessels. Transportation of loose $CO_2$ snow from a production location to the charging location results in vaporization losses, and charging by hand using scoops or the like typically results in further losses due to vaporization and spillage. Another problem is that it is difficult to assess production needs accurately in advance. This typically results in overproduction and waste. There is a need for a method and apparatus which enable solid $CO_2$ to be produced quickly and at low cost, and charged into shipping containers without excessive sublimation losses, in commercial operations such as that described above and in other applications where relatively small and variable quantities of $CO_2$ snow may be needed.

SUMMARY OF THE INVENTION

In accordance with the invention, there are provided a relatively inexpensive method and apparatus for producing solid carbon dioxide snow blocks which have higher density than, and are not as susceptible to evaporation as, loose $CO_2$ snow, but which do not require the use of expensive equipment employed in production of high-density blocks of dry ice. The snow blocks produced in accordance with the invention may be sized to facilitate estimation of quantities needed for particular applications, thus reducing or eliminating waste due to overproduction.

The apparatus generally comprises a mold having a number of separate mold cavities, and a liquid $CO_2$ manifold providing liquid $CO_2$ to one or more injection nozzles in each of the mold cavities. A vapor/snow separation barrier is provided to enable $CO_2$ vapor to escape without loss of $CO_2$ snow in the vent stream. A vent-vapor heat exchange with incoming liquid may be employed to improve the liquid-to-snow conversion rate. The manifold takes a pressure drop turn at each branch to assure that each nozzle receives an adequate supply of liquid $CO_2$. Each nozzle has multiple orifices to assure that the snow is injected in every direction. This may include six or eight equally spaced orifices on a horizontal plane. Each of the orifices is preferably located on a relative high point on the manifold, so that if a dry ice blockage occurs in the manifold, it may clear itself as a result of vapor rising to the blockage within the manifold.

A timer may be used to regulate injection. This is expected to be sufficient under normal conditions, providing that the quality and pressure of the liquid $CO_2$ source is known and constant. As an alternative or as a backup, fullness of one or more of the mold cavities may be detected by a sensor, such as a means for detecting deflection of the mold cover plate, and means may be provided to discontinue injection when one or more mold cavities has been filled.

DESCRIPTION OF PREFERRED EMBODIMENTS

The invention is generally embodied in a method and apparatus for producing blocks of $CO_2$ snow. In the illustrated embodiment, the apparatus generally comprises a mold 10 defining a plurality of separate mold cavities 12, and a liquid $CO_2$ manifold 14 providing an injection nozzle 16 in each of the mold cavities. It should be appreciated that in other embodiments of the invention, where larger mold cavities may be employed, it may be desirable to provide more than one injection nozzle in each of the mold cavities.

Figure 2:
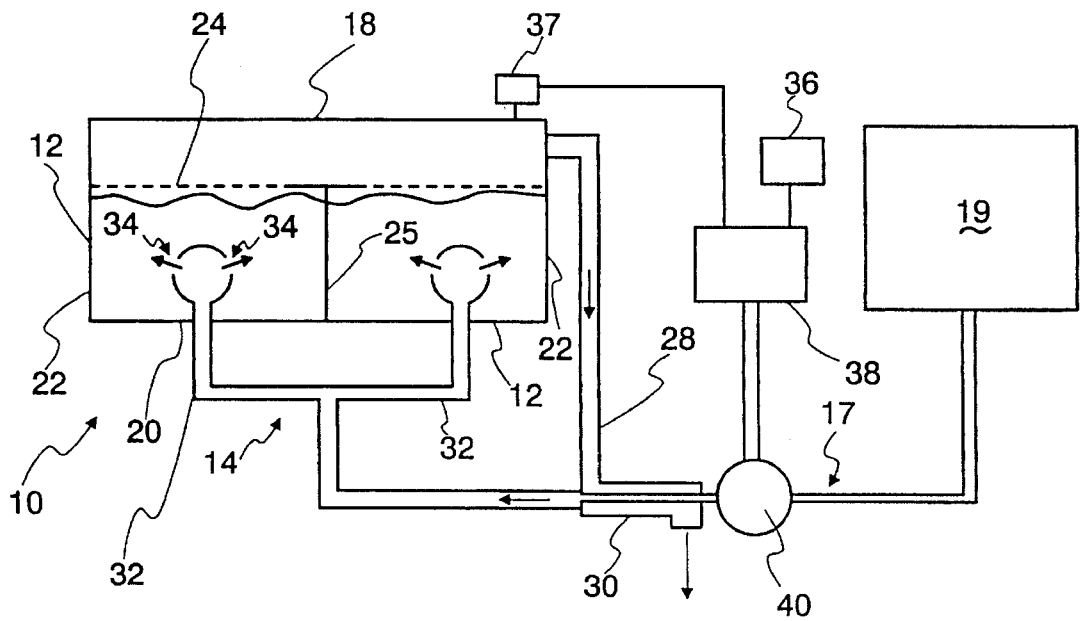
FIG. 2 is a diagrammatic elevational view of a system incorporating the apparatus of FIG. 1.

As shown in FIG. 2, liquid $CO_2$ is preferably provided by a conduit 17 such as a pipe or hose connecting a storage vessel 19 to the manifold 14. The storage vessel 19 contains $CO_2$ in liquid/vapor equilibrium at ambient temperature. In other embodiments, a refrigerated source of liquid $CO_2$ might be employed.

Figure 1:
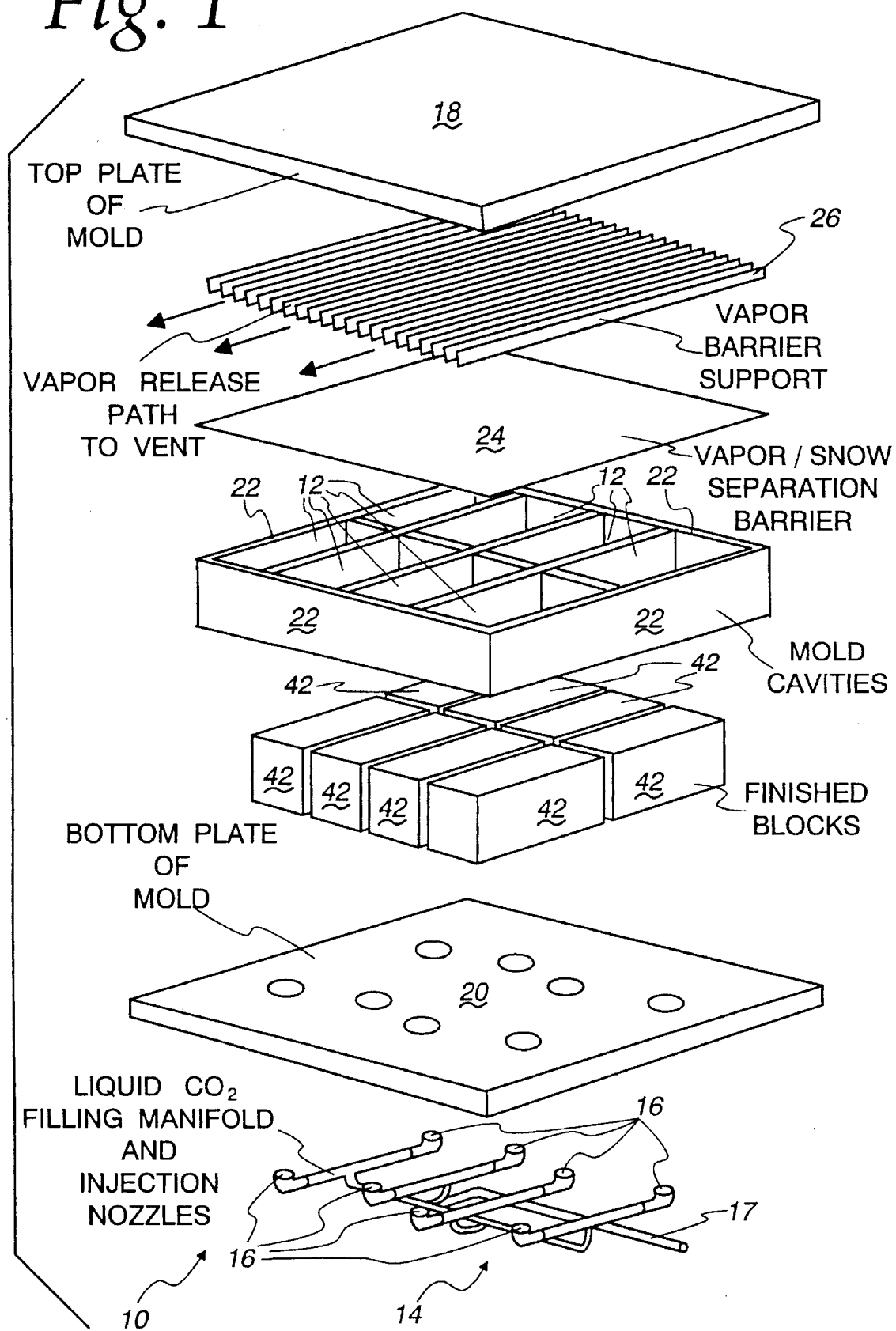
FIG. 1 is an exploded perspective view of apparatus in accordance with a first embodiment of the invention.

In the embodiment of FIG. 1, the mold generally comprises a cover plate or top wall 18, a bottom wall 20, a plurality of upstanding sidewalls 22, and a plurality of divider walls 25 which separate the cavities 12 from one another. The illustrated apparatus is configured to vent $CO_2$ vapor from the top of the mold cavities. To this end, a vapor/snow separation barrier 24 is positioned above the mold cavities, and a vapor barrier support 26 is disposed between the vapor/snow separation barrier and the top plate of the mold. The separation barrier is substantially impermeable to $CO_2$ snow, but is permeable to $CO_2$ vapor, so that $CO_2$ vapor may readily escape from the mold without substantial loss of $CO_2$ snow in the vapor stream. The illustrated vapor barrier support comprises a plurality of elongated strips extending horizontally parallel to one another to define passages therebetween for escape of the vapor, while maintaining downward pressure on the separation barrier 24. The strips may be affixed to the top wall 18.

As shown in FIG. 2, the $CO_2$ vapor may be captured by an exhaust conduit 28 and directed to a heat exchanger 30, providing a vent-vapor heat exchange with the incoming liquid $CO_2$ to improve the liquid-to-snow conversion rate. The mold cavities need not be pressurized, but rather may be maintained at about atmospheric pressure.

While the vapor is vented at the top of the mold in the illustrated embodiment, it should be appreciated that in other embodiments, the vapor may be vented at the bottom of the mold. This may facilitate connection of the top wall to the sidewalls and divider walls, which will permit the top wall, sidewalls, and divider walls to be lifted as a unit from the $CO_2$ snow blocks after completion of production, to facilitate removal of the blocks from the apparatus.

To provide substantially equal pressure at the various injection nozzles 16, the manifold 14 preferably has a 90° turn 32 in the supply pipe leading to each nozzle. Each nozzle preferably has multiple orifices 34 to inject $CO_2$ snow uniformly in various directions. To this end, each nozzle may have six or eight equally spaced orifices on a horizontal plane.

One potential problem with the illustrated apparatus is that it may be possible for solid $CO_2$ to form in the nozzles, which could potentially block flow of liquid $CO_2$. To avoid this problem, the system is preferably configured such that vapor within the manifold 14, or within the piping upstream of the manifold, tends to flow toward the nozzles 16 under gravitational force, so that vapor will reach any solid $CO_2$ blockage near the nozzles, effecting a phase change such that the solid melts to liquid phase. To this end, each of the nozzles 16 is disposed at a high point on the manifold 14 in the preferred embodiment.

In the preferred embodiment, a timer 36 is employed in conjunction with a controller 38 and controller-operated valve 40 to regulate injection. When the quality and pressure of the liquid $CO_2$ source is known and constant, it is expected that repeatable results may be obtained by setting a predetermined time for injection of the liquid $CO_2$. To account for variations, it may be desirable to provide a back-up system, such that injection will be discontinued when one or more of the mold cavities has been completely filled, to avoid waste of $CO_2$. To this end, a sensor 37 for detecting deflection of the top wall 18 of the mold 10 relative to the bottom wall 20 of the mold may be employed to generate a signal to a controller 38 which will discontinue flow of liquid $CO_2$ by closing the valve 40 when fullness of one or more cavities 12 is detected. With this system, the injection may be undertaken for a predetermined period of time, subject to being discontinued prior to expiration of the predetermined period of time if deflection of the top wall of the mold is detected. As an alternative, the sensor/deflection detection may be used as the exclusive means for regulating the length of the injection period. This may be particularly appropriate where the quality or pressure of the $CO_2$ is highly variable.

The above-described apparatus may be used to form blocks 42 of $CO_2$ snow have a density of about 45 lbs/ft³. For purposes of example, the apparatus may be used to manufacture simultaneously eight blocks, each having a density of about 8 inches by 10 inches by 4 inches, with a density of about 45 lbs/ft³. It should be appreciated that the invention may be employed to make blocks of various different sizes. In certain embodiments, it may be desirable to have more than one nozzle per mold cavity. For example, in molding blocks 10 inches by 10 inches by 2 inches, with the two inch dimension being the vertical dimension, it may be desirable to provide four separate nozzles within the mold cavity. For an even larger block, e.g., 36 inches by 36 inches by 4 inches, with the 4 inch dimension being the vertical dimension, it may be desirable to provide nine injection points in a three by three pattern. It will be appreciated that various other arrangements may be employed in accordance with the invention.

Figure 3:
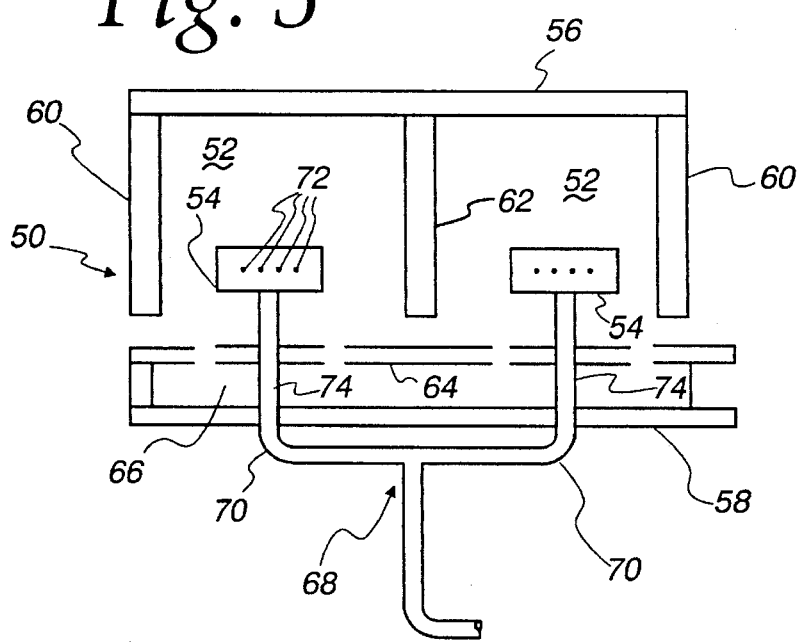
FIG. 3 is a diagrammatic elevational view of apparatus in accordance with a second embodiment of the invention.

FIG. 3 illustrates apparatus in accordance with a second embodiment of the invention. The apparatus is substantially similar to that of FIGS. 1 and 2, except that $CO_2$ vapor is vented at the bottom of the mold, rather than at the top. The top wall of the mold in FIG. 3 is directly connected to the sidewalls and divider walls, in order to enable the top wall, sidewalls, and divider walls to be removed as a unit from the bottom wall, to facilitate removal of the blocks after production. Accordingly, the apparatus of FIG. 3 comprises a mold 50 defining a pair of mold cavities 52, each having a nozzle 54 disposed therein. The mold includes a top wall 56, a bottom wall 58, a plurality of sidewalls 60, and a plurality of divider walls 62. A vapor/snow separation barrier 64 is supported above the bottom wall 58 by a suitable barrier support structure 66 similar to that shown in FIG. 1. Liquid $CO_2$ is supplied to the nozzles 54 by a manifold 68 having a 90° turn 70 before each nozzle, and a substantially vertical section 74 directing liquid $CO_2$ flow upward to each nozzle through the bottom wall of the mold, and through the barrier 64. Each of the illustrated nozzles has a disk-shaped head with a substantially circular cylindrical sidewall having eight evenly spaced orifices disposed in a horizontal plane therein. The upper section of the mold, comprising the top wall 56, sidewalls 60, and divider walls 62, is shown partly lifted from the bottom section of the mold. The orifices are indicated at 72.

From the foregoing, it should be appreciated that the invention provides a novel and improved method and apparatus for providing blocks of solid $CO_2$. The invention is not limited to the embodiments described above, but is more particularly described and pointed out in the claims which follow.

What is claimed:

1. A method of production of blocks of $CO_2$ snow comprising:

providing a plurality of mold cavities having interior volumes of substantially uniform size at substantially atmospheric pressure;

commencing injection of the liquid $CO_2$ into said plurality of mold cavities through a plurality of orifices simultaneously while permitting said liquid $CO_2$ to expand into $CO_2$ snow in said mold cavities;

permitting $CO_2$ vapor to escape from said mold cavities continuously to maintain pressure in said mold cavities near atmospheric pressure;

continuing injection of said liquid $CO_2$ for a predetermined period of time in the absence of an override;

detecting whether one of said mold cavities has been substantially filled;

discontinuing said injection if fullness is detected before the end of said predetermined period of time, whereby blocks of $CO_2$ snow are produced in said mold cavities.

2. A method in accordance with claim 1 wherein said detecting comprises sensing displacement of a panel which serves as a wall of at least one of said mold cavities.

3. A method in accordance with claim 1 further comprising employing escaped $CO_2$ vapor to lower the temperature of incoming liquid $CO_2$ prior to injection thereof.

4. A method in accordance with claim 1 wherein the injection of the liquid $CO_2$ into said plurality of mold cavities comprises injecting the liquid $CO_2$ through a plurality of nozzles, each having a plurality of orifices disposed substantially in a horizontal plane.

5. Apparatus for production of blocks of $CO_2$ snow comprising:

a supply of liquid $CO_2$;

a mold defining a plurality of mold cavities having interior volumes of substantially uniform size at substantially atmospheric pressure;

means for supplying the liquid $CO_2$ to said plurality of mold cavities;

means for injecting the liquid $CO_2$ into said plurality of mold cavities simultaneously so that said liquid $CO_2$ expands into $CO_2$ snow in said mold cavities, and continuing said injection for a predetermined period of time;

means for permitting $CO_2$ vapor to escape from said mold cavities;

means for discontinuing injection at the end of said predetermined period of time;

means for detecting whether one of said mold cavities has been substantially filled; and means for discontinuing injection before the end of said predetermined period of time if fullness is detected before the end of said predetermined period of time.

6. Apparatus in accordance with claim 5 wherein said means for detecting comprises means for sensing displacement of a panel which serves as a wall of at least one of said molds.

7. Apparatus in accordance with claim 5 further comprising a heat exchanger for exchanging heat between said $CO_2$ vapor and said liquid $CO_2$.

8. Apparatus in accordance with claim 7 wherein said means for supplying the liquid $CO_2$ to said plurality of mold cavities comprises a manifold having a 90° pressure drop turn before each nozzle.

9. Apparatus in accordance with claim 5 wherein said mold comprises a bottom wall, a top wall, at least one sidewall, and at least one divider wall, said at least one sidewall being connected to said top wall and being removable from said bottom wall so that said mold may be opened by lifting said top wall away from said bottom wall with said at least one sidewall remaining attached to said top wall.

10. Apparatus in accordance with claim 9 wherein said means for permitting $CO_2$ vapor to escape from said mold cavities comprises a separation barrier which defines a bottom surface for the mold cavities and is disposed adjacent said bottom wall and spaced above said bottom wall;

said separation barrier being permeable to $CO_2$ vapor but substantially impermeable to $CO_2$ snow so that $CO_2$ vapor may be vented from the mold through the bottoms of said mold cavities without substantial loss of $CO_2$ snow in the vapor stream.

11. Apparatus in accordance with claim 5 wherein the means for injecting the liquid $CO_2$ into said plurality of mold cavities comprises a plurality of nozzles, one disposed in each cavity.

12. Apparatus in accordance with claim 11 wherein each of said nozzles is configured to discharge $CO_2$ generally horizontally through a plurality of orifices.

13. Apparatus for production of blocks of $CO_2$ snow comprising:

a supply of liquid $CO_2$;

a mold defining a plurality of mold cavities;

a delivery system for supplying liquid $CO_2$ to said plurality of mold cavities, said delivery system comprising a plurality of nozzles, at least one of said nozzles being disposed in each of said mold cavities, a manifold supplying liquid $CO_2$ to said nozzles, and a conduit supplying liquid $CO_2$ from said supply of liquid $CO_2$ to said manifold;

a vapor/snow separation barrier for permitting $CO_2$ vapor to escape from said mold cavities while restricting solid $CO_2$ from escaping;

said mold comprising a top wall, a bottom wall, a plurality of sidewalls connecting said bottom wall to said top wall, and a plurality of divider walls separating said mold cavities from one another;

wherein said top wall, sidewalls, and divider walls are connected to one another and are removable from said bottom wall to facilitate removal of $CO_2$ snow blocks from said mold cavities.

14. Apparatus in accordance with claim 13 wherein each of said nozzles has a plurality of orifices disposed substantially coplanar with one another in a horizontal plane.

15. Apparatus in accordance with claim 13 wherein said manifold is configured to provide for upward flow of $CO_2$ to said nozzles so that any blockages caused by formation of solid $CO_2$ in said nozzles may be cleared by gravitational flow of $CO_2$ vapor through said manifold to said blockages.

16. Apparatus in accordance with claim 13 further comprising a heat exchanger for transferring heat from inflowing liquid $CO_2$ to $CO_2$ vapor which has escaped from said mold.

17. Apparatus in accordance with claim 13 wherein $CO_2$ vapor is vented from the top of each of said mold cavities.

\* \* \* \* \*